United States Patent
Ypma et al.

(10) Patent No.: US 11,623,567 B2
(45) Date of Patent: Apr. 11, 2023

(54) RAMPS FOR REARVIEW ASSEMBLY MOUNTS

(71) Applicant: GENTEX CORPORATION, Zeeland, MI (US)

(72) Inventors: Kenton J. Ypma, Hudsonville, MI (US); Gregory M. Ejsmont, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 128 days.

(21) Appl. No.: 17/197,160

(22) Filed: Mar. 10, 2021

(65) Prior Publication Data

US 2021/0284067 A1 Sep. 16, 2021

Related U.S. Application Data

(60) Provisional application No. 62/987,370, filed on Mar. 10, 2020.

(51) Int. Cl.
*B60R 1/04* (2006.01)
(52) U.S. Cl.
CPC ..................... *B60R 1/04* (2013.01)
(58) Field of Classification Search
CPC ......... B60R 1/04; B60R 1/12; B60R 11/0235; B60R 2001/1215; B60R 2011/0026; F16F 1/26
USPC .... 248/549, 548, 466, 475.1, 476, 479, 481, 248/494, 495, 220.22, 221.11, 222.11, 248/222.12, 222.13; 359/871, 872, 873
See application file for complete search history.

(56) References Cited

U.S. PATENT DOCUMENTS

| | | | |
|---|---|---|---|
| 4,936,533 A | * | 6/1990 | Adams ...................... B60R 1/04 248/222.13 |
| 5,377,948 A | | 1/1995 | Suman et al. |
| 5,820,097 A | * | 10/1998 | Spooner .................... B60R 1/04 248/549 |

(Continued)

FOREIGN PATENT DOCUMENTS

| | | |
|---|---|---|
| CN | 108290523 A | 7/2018 |
| DE | 69309828 T2 | 12/1997 |

(Continued)

OTHER PUBLICATIONS

U.S. Appl. No. 07/703,381, filed May 21, 1991, Danny L. Suman.

(Continued)

*Primary Examiner* — Terrell L McKinnon
*Assistant Examiner* — Michael McDuffie
(74) *Attorney, Agent, or Firm* — Price Heneveld LLP; Brian James Brewer

(57) ABSTRACT

A rearview device comprises a rearview assembly having a display surface and a housing configured to support the display surface; and a mount configured to connect to and support the housing. The mount may be slidably securable in a first direction to a mounting bracket and slidably detachable in a second direction from the mounting bracket. The mount may comprise at least one projecting ramp, the at least one projecting ramp configured to, upon the mount being slidably detached from the mounting bracket, change the orientation of the housing relative to the bracket to prevent the housing from impacting the mounting bracket.

12 Claims, 6 Drawing Sheets

(56) References Cited

U.S. PATENT DOCUMENTS

| | | | |
|---|---|---|---|
| 5,931,440 A * | 8/1999 | Miller | B60R 1/04 |
| | | | 248/549 |
| 6,068,380 A | 5/2000 | Lynn et al. | |
| 7,717,394 B2 * | 5/2010 | Tanaka | B60R 1/04 |
| | | | 248/479 |
| 7,726,623 B2 * | 6/2010 | Muller | B60R 1/04 |
| | | | 248/475.1 |
| 8,210,695 B2 * | 7/2012 | Roth | B60R 1/12 |
| | | | 359/872 |
| 9,056,584 B2 | 6/2015 | Fish, Jr. et al. | |
| 9,174,577 B2 | 11/2015 | Busscher et al. | |
| 9,352,692 B2 * | 5/2016 | Uken | B60R 19/46 |
| 9,440,586 B2 | 9/2016 | Karner et al. | |
| 9,682,656 B2 * | 6/2017 | Busscher | F16F 1/26 |
| 10,189,408 B2 | 1/2019 | Hallack et al. | |
| 10,190,610 B1 | 1/2019 | Busscher et al. | |
| 10,434,946 B2 * | 10/2019 | Busscher | B60R 1/04 |
| 10,744,944 B2 * | 8/2020 | Steffes | B60R 1/086 |
| 11,040,663 B2 * | 6/2021 | DeMaagd | B60R 1/04 |
| 11,254,264 B2 * | 2/2022 | Sugimura | B60R 1/04 |
| 11,285,876 B2 * | 3/2022 | Sugimura | B60R 1/12 |
| 2002/0088916 A1 | 7/2002 | March et al. | |
| 2004/0195486 A1 | 10/2004 | Rumsey et al. | |
| 2004/0196577 A1 | 10/2004 | Carter et al. | |
| 2004/0232773 A1 | 11/2004 | Parker et al. | |
| 2004/0264016 A1 | 12/2004 | Ostreko et al. | |
| 2005/0128610 A1 | 6/2005 | Parker et al. | |
| 2007/0041110 A1 | 2/2007 | Hoek et al. | |
| 2012/0218655 A1 | 8/2012 | Steel et al. | |
| 2012/0218656 A1 | 8/2012 | Roth et al. | |
| 2013/0187017 A1 | 7/2013 | Roth | |
| 2013/0235600 A1 | 9/2013 | Fogg et al. | |
| 2014/0055617 A1 | 2/2014 | Minikey, Jr. et al. | |
| 2014/0091123 A1 | 4/2014 | Kim et al. | |
| 2014/0097320 A1 | 4/2014 | Rizk et al. | |
| 2015/0022913 A1 | 1/2015 | Minikey, Jr. | |
| 2015/0224928 A1 | 8/2015 | Busscher et al. | |
| 2016/0023605 A1 | 1/2016 | Busscher et al. | |
| 2016/0129842 A1 | 5/2016 | Kuester | |
| 2016/0250972 A1 | 9/2016 | Kuester et al. | |
| 2016/0250974 A1 | 9/2016 | Kuester et al. | |
| 2016/0341963 A1 | 11/2016 | Minikey, Jr. et al. | |
| 2017/0064165 A1 * | 3/2017 | Onishi | H04N 5/2252 |
| 2017/0080867 A1 | 3/2017 | Hallack et al. | |
| 2017/0363840 A1 | 12/2017 | Faber | |
| 2018/0251070 A1 | 9/2018 | Hallack et al. | |
| 2018/0272949 A1 | 9/2018 | Kuester et al. | |
| 2019/0023185 A1 | 1/2019 | Minikey, Jr. et al. | |
| 2019/0176705 A1 | 6/2019 | DeMaagd et al. | |

FOREIGN PATENT DOCUMENTS

| | | |
|---|---|---|
| EP | 0590111 B1 | 4/1997 |
| RU | 2083393 C1 | 7/1997 |

OTHER PUBLICATIONS

U.S. Appl. No. 17/197,160, filed Mar. 10, 2021, GENTEX CORPORATION.

International Search Report dated Jun. 24, 2021, for corresponding PCT application No. PCT/US2021/021614, 3 pages.

Written Opinion dated Jun. 24, 2021, for corresponding PCT application No. PCT/US2021/021614, 5 pages.

International Preliminary Report on Patentability dated Sep. 6, 2022, for corresponding PCT application No. PCT/US2021/021614, 6 pages.

* cited by examiner

RAMPS FOR REARVIEW ASSEMBLY MOUNTS

CROSS REFERENCE TO RELATED APPLICATIONS

This application claims the benefit of and priority to U.S. Provisional Patent Application No. 62/987,370, filed on Mar. 10, 2020, entitled Ramps for Rearview Assembly Mounts, the entire disclosure of which is hereby incorporated herein by reference.

FIELD OF THE DISCLOSURE

This disclosure relates generally to rearview assemblies, and in particular, to mounts for rearview assemblies.

BACKGROUND

Some rearview assemblies for vehicles may be configured to slide on to a mounting bracket on the vehicle windscreen for mounting and to slide off the mounting bracket for easy removal. However, with some configurations of rearview assemblies, during safety testing, portions of the rearview assembly may contact the mounting bracket. This may cause breakage of portions of the rearview assembly, and in particular, breakage of glass portions of the rearview assembly. This, in turn, may cause the rearview assembly and mount to fail the safety testing. More importantly, this may result in an unsafe condition for occupants in a vehicle in the event of a collision.

SUMMARY

According to an aspect, rearview device may comprise a rearview assembly comprising a display surface and a housing configured to support the display surface; and a mount configured to connect to and support the housing, the mount slidably securable in a first direction to a mounting bracket and slidably detachable in a second direction from the mounting bracket. The first direction may be generally opposite the second direction. The mount may comprise at least one projecting ramp, the at least one projecting ramp configured to, upon the mount being slidably detached from the mounting bracket, change an orientation of the housing relative to the bracket. The change in orientation of the housing may prevent the housing from impacting the mounting bracket.

The mount may comprise a first end and a second end, the first end secured to the housing and the second comprising a mounting area. The mounting area may have a first side proximate to the housing; and the at least one projecting ramp may extend from the first side of the mounting area. The mount further may comprise a mounting spring having at least one end, the mounting bracket may have at least one guide channel, each guide channel configured to receive one of the at least one ends of the mounting spring. Each of the at least one ends of the mounting spring may be configured to fit within and slide along one of the guide channels during the securing and the detaching of the mount from the mounting bracket. The mounting bracket may have at least one side wall extending along a side of mounting bracket. At least one of the projecting ramps may be configured to, during removal of the rearview device, press against one of the side walls for at least a portion of the removal.

The mount may be slidably detachable from the mounting bracket. During the detaching of the mount from the mounting bracket the at least one end of the mounting spring may be released from the guide channel and, upon the release of the mounting spring from the guide channel, the at least one projecting ramp may further change the orientation of the rearview assembly in a trajectory that causes the rearview assembly to pass by the mounting bracket without impact. Changing the orientation of the rearview assembly may comprise rotating the rearview assembly. The mounting bracket may be configured to be secured to a windshield of a vehicle.

According to another aspect, a system for mounting a rearview assembly to a vehicle, may comprise a mount having a first end and a second end, the first end secured to the rearview assembly and the second end comprising a mounting area having at least one projecting ramp extending therefrom. The system may further comprise a mounting bracket having at least one side wall extending along a side of the mounting bracket, the at least one side wall comprising a first wall surface, a second wall surface and a third wall surface. The first wall surface may be generally parallel to the second wall surface, and the third wall surface may extend between and be generally orthogonal to the first and second wall surfaces. The second end of the mount may be slidably securable to the mounting bracket when slid in a first direction and slidably removable from the mounting bracket when slid in a second direction. The first direction may be generally opposite the second direction. One of the at least one projecting ramps may be configured to push against the third wall surface of one of the at least one side walls during removal of the mount from the mounting bracket. The mounting bracket may further comprise at least one guide channel extending in a direction generally parallel to the at least one side wall of the mounting bracket. The mount may further comprise a mounting spring having at least one end; and the at least one guide channel may be configured to accept at least one end of the mounting spring and to allow the at least one end of the mounting spring to slide within the guide channel.

Each of the at least one guide channels may be recessed within one of the side walls of the mounting bracket. During the removal of the mount from the mounting bracket, as the at least one end of the mounting spring exits from the guide channel, the at least one projecting ramp may push against the third wall surface of the at least one side wall, thereby rotating the rearview assembly. The mounting bracket may be configured to be secured to a vehicle windshield.

According to another aspect, a method for removing a rearview assembly from a mounting bracket may comprise providing a mount having a first end and a second end and a rearview assembly secured to the first end of the mount, the second end of the mount slidably secured to the mounting bracket, causing the mount to slide in a direction that will cause it to be released from the mounting bracket; causing, by at least one projecting ramp extending from the rearview assembly, the rotation of the mount and the attached rearview assembly as the mount releases from the mounting bracket, thereby preventing the rearview assembly from contacting the mounting bracket.

DETAILED DESCRIPTION

Figure 1:
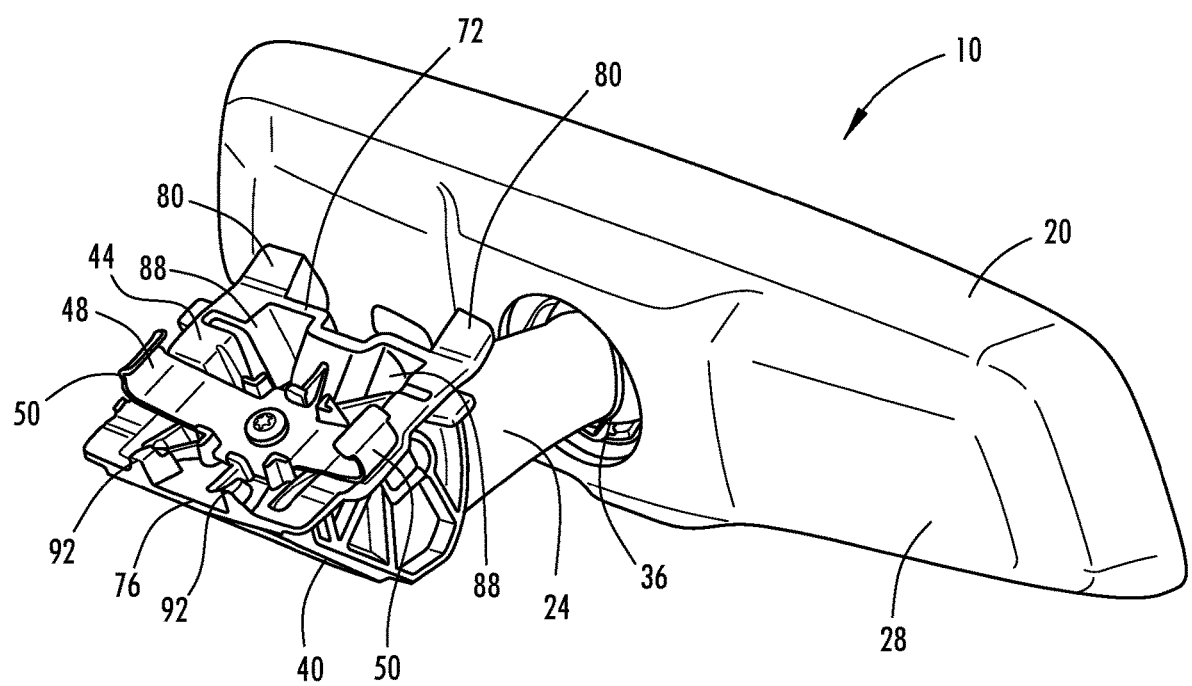
FIG. 1 illustrates a top perspective view of a rearview assembly and mount in accordance with this disclosure.
Figure 2:
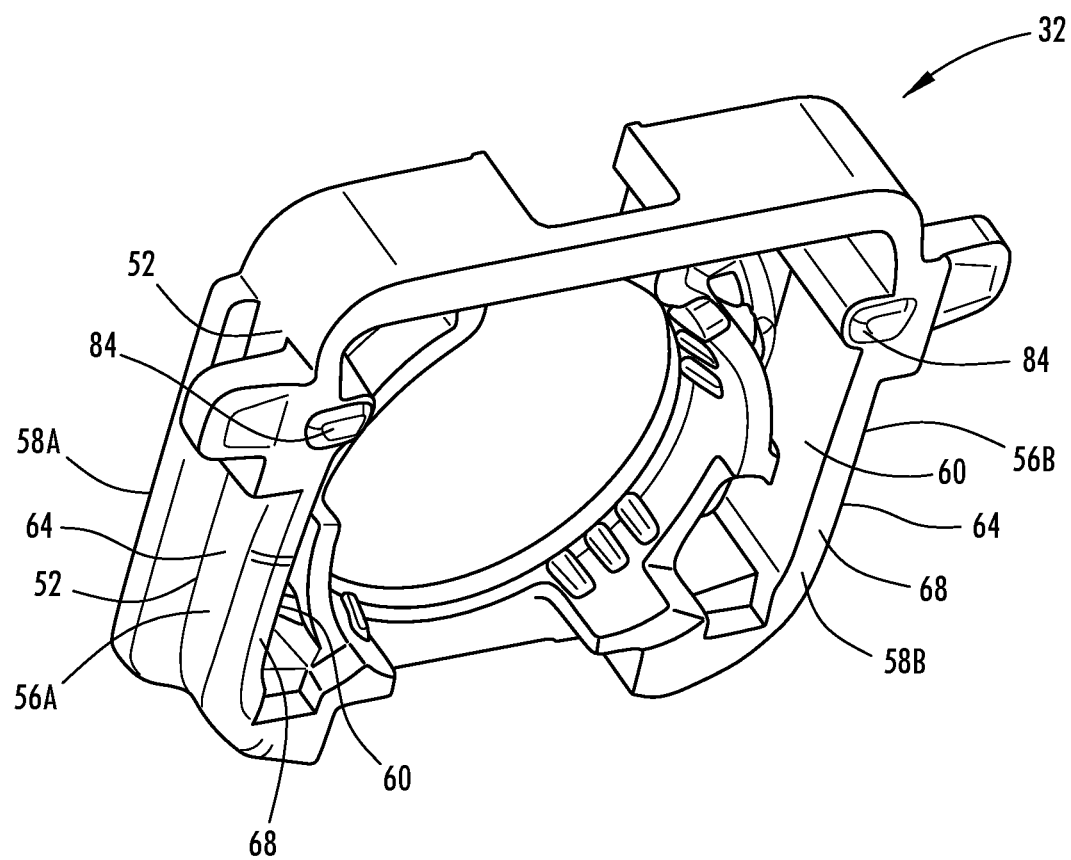
FIG. 2 illustrates a bottom perspective view of a mounting bracket in accordance with this disclosure.

Referring to FIG. 1, a rearview device 10 may comprise a rearview assembly 20 and a mount 24. Rearview assembly 20 may comprise a housing 28 and a display surface (not shown) supported by housing 28. Mount 24 may be operable to secure rearview assembly 20 to a mounting bracket 32, shown in FIG. 2. In some embodiments, mount 24 may be slidably securable to mounting bracket 32. Mounting bracket 32 may be secured to a portion of a vehicle such as, for example, a vehicle windshield. In some embodiments, mounting bracket 32 may be secured to a vehicle roof (not shown) or to a console (not shown) mounted against the vehicle roof. Mount 24 may have a first end 36 and a second end 40. First end 36 of mount 24 may be secured to housing 28. Second end 40 of mount 24 may comprise a mounting area 44 securable to mounting bracket 32. Mounting area may comprise, for example, a generally flat surface or a plurality of walls.

Figure 3:
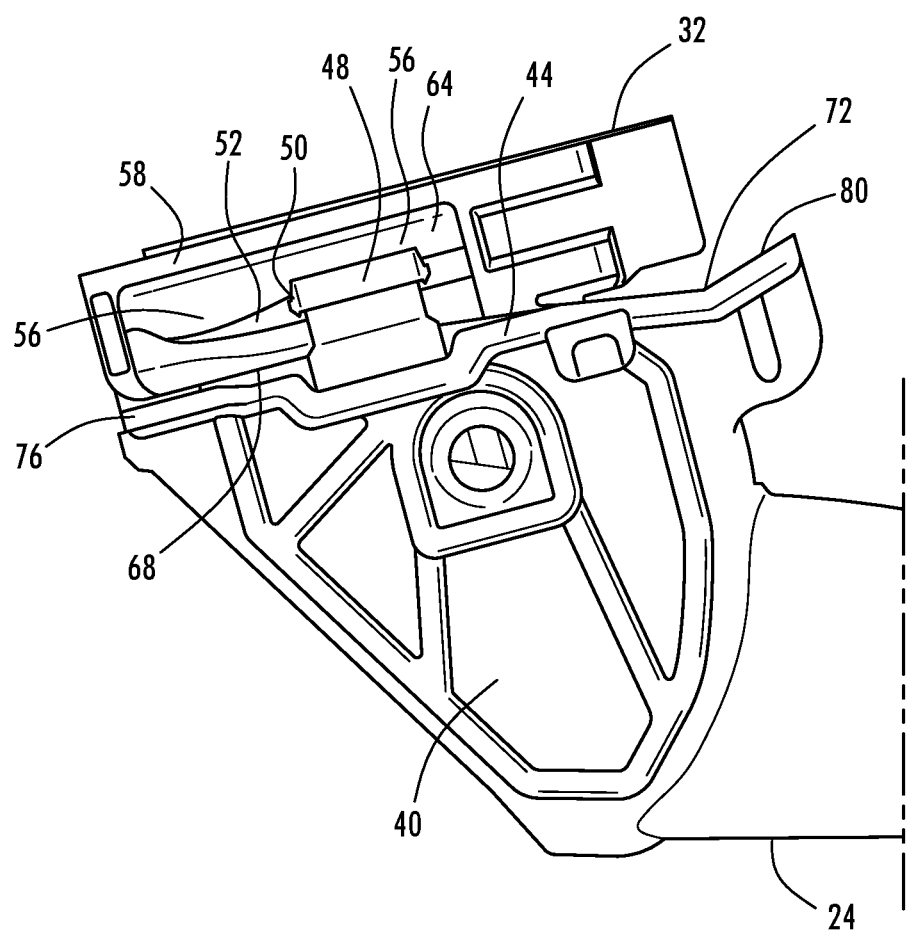
FIG. 3 illustrates a side view of the mount of a rearview device secured to a mounting bracket.

In some embodiments, second end 40 of mount 24 may comprise at least one mounting spring or other fastener 48. Mounting spring 48 may have at least one end 50 and may be configured to removably secure rearview device 10 to mounting bracket 32. In some embodiments, mounting bracket 32 may comprise at least one guide channel 52, as shown in FIG. 3. The at least one guide channel 52 may be recessed into one of at least one side walls 56 of mounting bracket 32. Mounting spring 48 may be configured so the at least one end 50 of mounting spring 48 fits within one of the at least one guide channels 52. The at least one end 50 of mounting spring 48 may be configured to be slidably moveable within the at least one guide channel 52.

Once each of the at least one ends 50 of mounting spring 48 have been placed into one of the guide channels 52, mount 24 may be slid along mounting bracket 32 in a first direction until it is in the desired position. As mount 24 slides along mounting bracket 32 in the first direction, each of the at least one ends 50 of mounting spring 48 may slide along one of the guide channels 52. Similarly, to remove or detach rearview device 10 from mounting bracket 32, mount 24 may be slid along mounting bracket 32 in a second direction generally opposite to the first direction. As mount 24 is slid along mounting bracket 32 in the second direction, each of the at least one ends 50 of mounting spring 48 may slide along one of the guide channels 52.

In some embodiments, mounting bracket 32 may be generally rectangular or square in shape. In some embodiments, mounting bracket 32 may have two sides 58. The at least one side wall 56 may extend along at least one side 58 of mounting bracket 32. In some embodiments, mounting bracket 32 may have a first side wall 56A extending along a first side 58A and a second side wall 56B generally parallel to first side wall 56A and extending along a second side 58B of mounting bracket 32. Each of the at least one side walls 56 may have a first wall surface 60, a second wall surface 64 and a third wall surface 68 extending therebetween. First wall surface 60 may be generally parallel to second wall surface 64, and third wall surface 68 may be generally orthogonal to first and second wall surfaces 60, 64.

Figure 4:
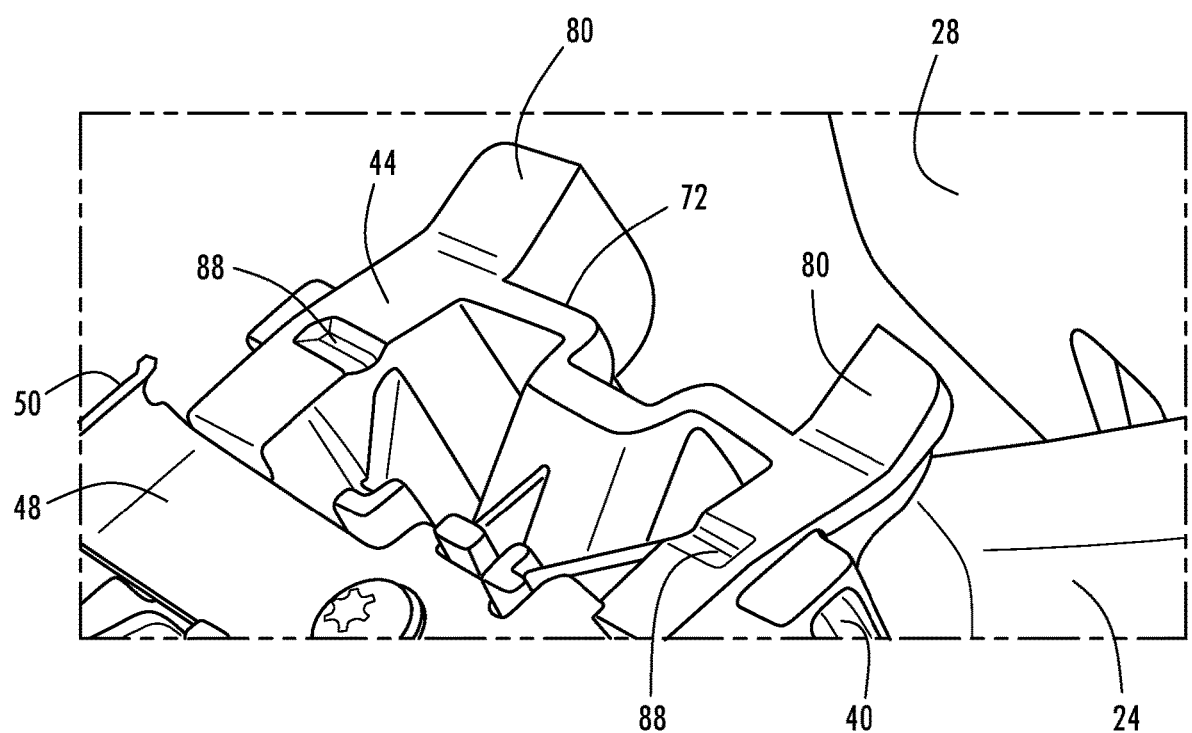
FIG. 4 illustrates a top perspective view of a portion of the mount and showing the projecting ramps illustrated in FIG. 1.

In some embodiments, mounting area 44 may comprise a first side 72 and a second side 76. First side 72 may be the side closest to rearview assembly 20, and second side 76 may be the side most remote from rearview assembly 20. As shown in FIG. 4, at least one projecting ramp 80 may be disposed on first side 72 of mounting area 44 and may extend from mounting area 44. Each of the at least one projecting ramps 80 may extend generally toward rearview assembly 20 and may be disposed at an angle from mounting area 44. Each of the at least one projecting ramps 80 may be associated with one of the at least one side walls 56 of mounting bracket 32 and each may be configured to slide along third wall surface 68 of the associated side wall 56 during the installation and removal of rearview device 10.

Figure 5:
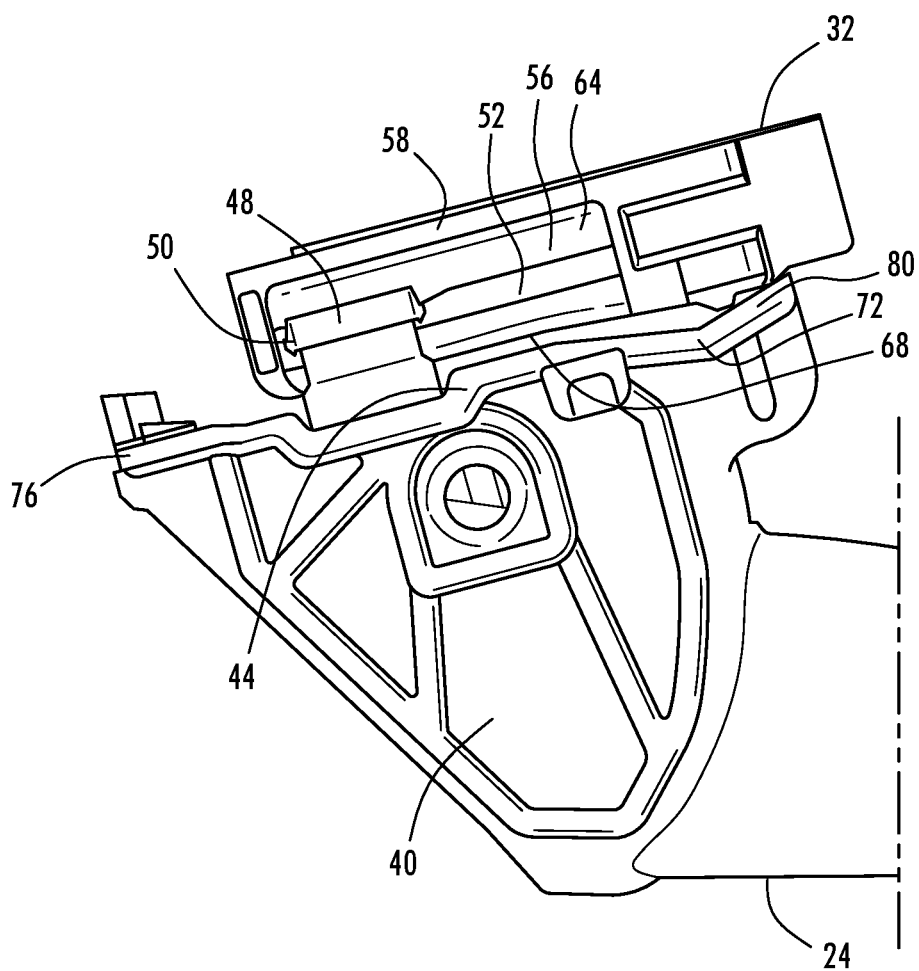
FIG. 5 illustrates a side view of the mount of a rearview device partially removed from the mounting bracket.
Figure 6:
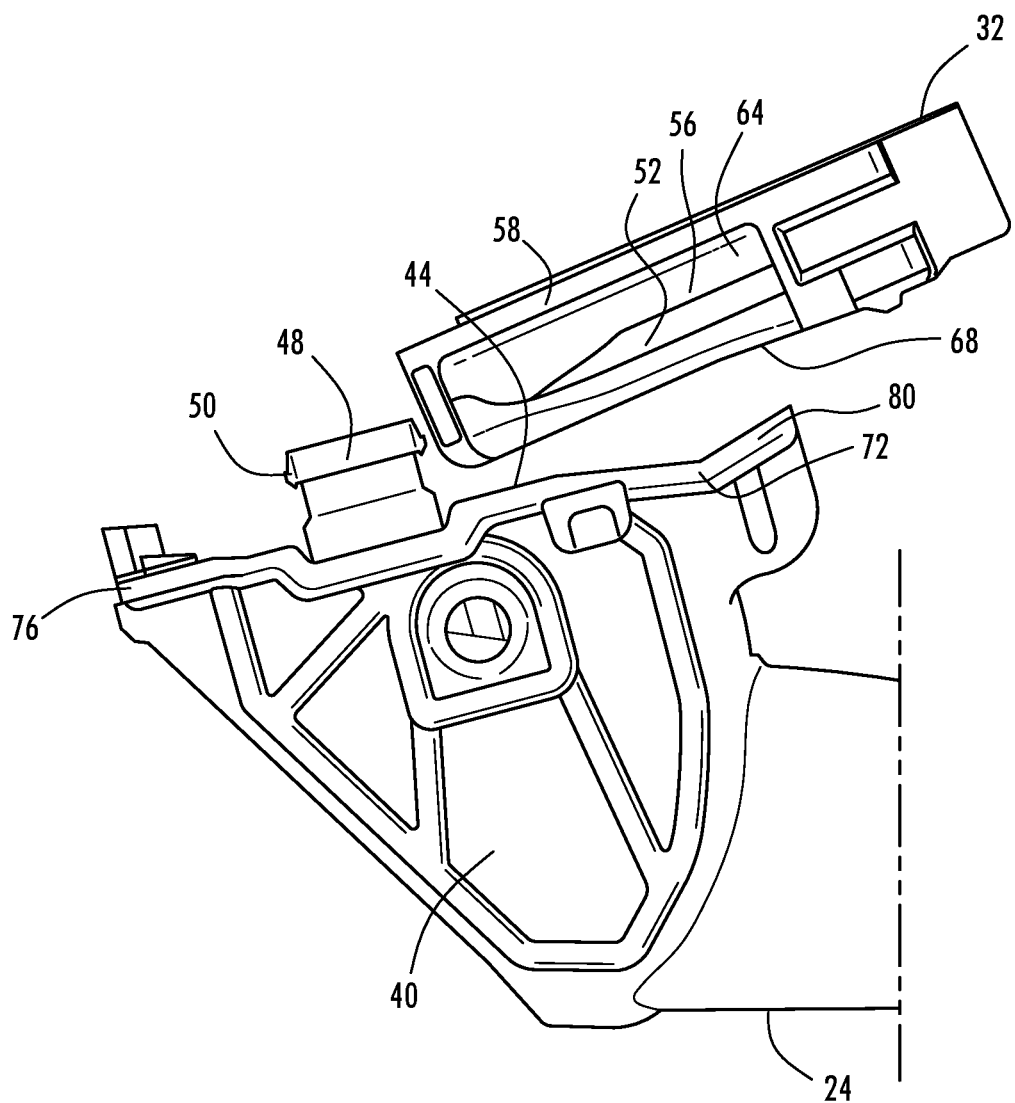
FIG. 6 illustrates a side view of the mount of a rearview device completely removed from the mounting bracket.

When in place on mounting bracket 32, rearview device 10 may be in a locked position, as shown in FIG. 3. To remove rearview device 10 from mounting bracket 32, rearview device 10 may be slid from the locked position in the second direction. Each of the at least one ends 50 of mounting spring 48 may move along one of the guide channels 52 as shown in FIG. 5. Each of the at least one projecting ramps 80 may be configured to be in contact with and push against third wall surface 68 of the associated side wall 56 as mount 24 slides along mounting bracket 32. As the at least one end 50 of mounting spring 48 exits from the at least one guide channel 52 of mounting bracket 32, the at least one projecting ramp 80 may continue to push against third wall surface 68 of the associated side wall 56, thereby causing rearview device 10 to rotate as it is released from mounting bracket 32, as shown in FIG. 6. The rotation of rearview device 10 may cause rearview device 10 to release from mounting bracket 32 in a trajectory in which rearview device 10 does not contact mounting bracket 32, thereby avoiding breakage of rearview device 10 due to contact with mounting bracket 32.

At least one locking projection 84 may extend from one of mounting bracket 32 and/or mounting area 44. At least one aperture 88 may be disposed on one of mounting area 44 and/or mounting bracket 32, and each aperture 88 may be configured to be opposite one of the least one locking projections 84 when mount 24 is secured to mounting bracket 32. Each of the at least one locking projections 84 may be configured to fit into one of the apertures 88. When mount 24 is in the desired position on mounting bracket 32, locking projections 84 may be disposed within apertures 88. This may help to secure rearview device 10 to mounting bracket 32

At least one brake 92 may be disposed on second side 76 of mounting area 44. The at least one brake 92 may extend outwardly from second side 76 of mounting area 44. The at least one brake 92 may be configured to assist in positioning rearview device 10 during installation. The at least one brake 92 may, upon rearview device 10 reaching the desired position during installation, butt up against a portion of mounting bracket 32, thereby preventing rearview device 10 from being pushed beyond the desired position.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The invention claimed is:

1. A rearview device comprising:
   a rearview assembly comprising a display surface and a housing configured to support the display surface; and
   a mount connected to and configured to support the housing, the mount slidably securable in a first direction to a mounting bracket and slidably detachable in a second direction from the mounting bracket, the mounting bracket comprising at least one side wall extending along a side of the mounting bracket, wherein the at least one side wall comprises a first wall surface, a second wall surface, and a third wall surface extending between the first and second wall surfaces, and at least one guide channel extending in a direction generally parallel to the at least one side wall of the mounting bracket;
   wherein the mount comprises at least one projecting ramp;
   wherein the mount comprises a mounting spring having at least one end;
   wherein the at least one guide channel is configured to accept at least one end of the mounting spring and to allow the at least one end of the mounting spring to slide within the guide channel during the securing to and the detaching of the mount from the mounting bracket;
   wherein, as the mount is slidably detached from the mounting bracket, the at least one end of the mounting spring is configured to exit from the guide channel;
   wherein the at least one projecting ramp is configured to push against the third wall surface of the at least one side wall, thereby rotating the rearview assembly; and
   wherein the at least one projecting ramp is configured to, upon the mount being slidably detached from the mounting bracket, change an orientation of the rearview assembly relative to the mounting bracket.

2. The rearview device of claim 1, wherein the mount comprises a first end and a second end;
   wherein the first end is secured to the housing and the second end comprises a mounting area;
   wherein the mounting area has a first side proximate to the housing;
   wherein the at least one projecting ramp extends from the first side of the mounting area.

3. The rearview device of claim 1, wherein, as the mount is being slidably detached from the mounting bracket, each of the at least one ends of the mounting spring is released from the guide channel; and wherein, upon the release of the at least one end of the mounting spring from the guide channel, the at least one projecting ramp is configured to further change the orientation of the rearview assembly.

4. The rearview device of claim 1, wherein the first direction is generally opposite the second direction.

5. The rearview device of claim 1, wherein the mounting bracket is configured to be secured to a windshield of a vehicle.

6. A system for mounting a rearview assembly to a vehicle, comprising:
   a rearview assembly;
   a mount having a first end and a second end, the first end secured to the rearview assembly and the second end comprising a mounting area having at least one projecting ramp extending therefrom;
   a mounting bracket having at least one side wall extending along a side of the mounting bracket wherein the at least one side wall comprises a first wall surface, a second wall surface, and a third wall surface extending between the first and second wall surfaces;
   wherein the second end of the mount is slidably securable to the mounting bracket when slid in a first direction and slidably detachable from the mounting bracket when slid in a second direction;
   wherein the mounting bracket comprises at least one guide channel extending in a direction generally parallel to the at least one side wall of the mounting bracket;
   wherein the mount comprises a mounting spring having at least one end;
   wherein the at least one guide channel is configured to accept at least one end of the mounting spring and to allow the at least one end of the mounting spring to slide within the guide channel;
   wherein, as the mount is slidably detached from the mounting bracket, the at least one end of the mounting spring is configured to exit from the guide channel; and
   wherein the at least one projecting ramp is configured to push against the third wall surface of the at least one side wall, thereby rotating the rearview assembly.

7. The system of claim 6, wherein the first wall surface is generally parallel to the second wall surface; and wherein the third wall surface is generally orthogonal to the first and second wall surfaces.

8. The system of claim 6, wherein the first direction is generally opposite the second direction.

9. The system of claim 6, wherein one of the at least one projecting ramps is configured to push against the third wall surface of one of the at least one side walls as the mount is slidably detached from the mounting bracket.

10. The system of claim 6, wherein each of the at least one guide channels is recessed within one of the side walls of the mounting bracket.

11. The system of claim 6, wherein the mounting bracket is configured to be secured to a vehicle windshield.

12. A method of removing a rearview assembly from a mounting bracket, comprising:
   providing a mount having a first end and a second end and a rearview assembly secured to the first end of the mount, the second end of the mount slidably secured to the mounting bracket, wherein the mounting bracket has at least one side wall extending along a side of the mounting bracket wherein the at least one side wall comprises a first wall surface, a second wall surface, and a third wall surface extending between the first and second wall surfaces;
   causing the mount to slide in a direction that will cause it to be released from the mounting bracket;
   causing a first end of a mounting spring to slide within a guide channel, the guide channel configured to accept the first end of the mounting spring and to allow the first end of the mounting spring to slide within the guide channel, and the first end of the mounting spring is configured to slide within the guide channel;
   causing, by at least one projecting ramp extending from the rearview assembly, the rotation of the mount and the attached rearview assembly as the mount releases from the mounting bracket, the rotation caused by the at least one projecting ramp pushing against the third wall surface of the mounting bracket, the rotation thereby preventing the rearview assembly from contacting the mounting bracket.

* * * * *